March 24, 1931.  C. D. COMSTOCK  1,798,067
INKBOTTLE
Filed April 6, 1929
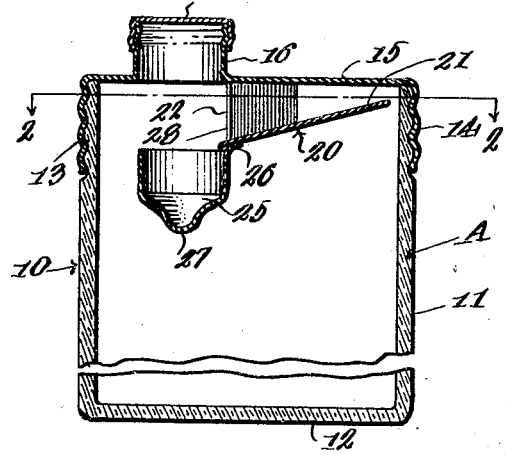
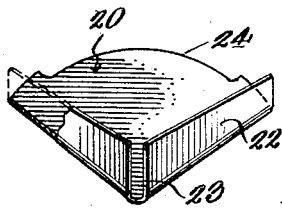
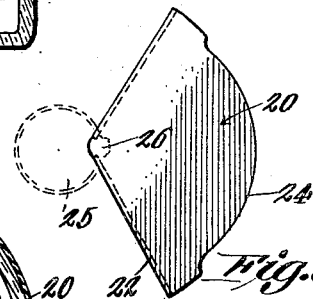
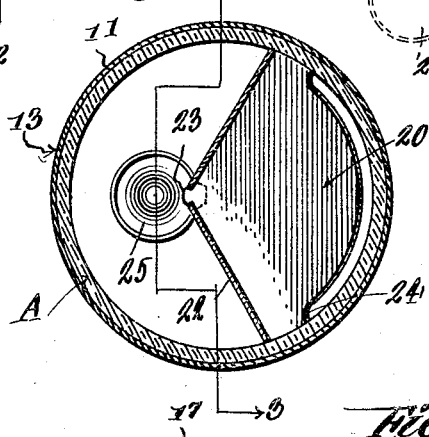
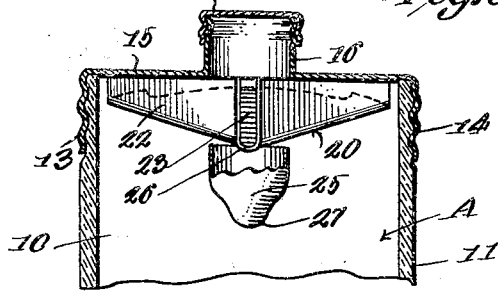
WITNESS
INVENTOR.
CARL D. COMSTOCK.
BY
ATTORNEYS.

Patented Mar. 24, 1931

1,798,067

UNITED STATES PATENT OFFICE

CARL D. COMSTOCK, OF SANTA FE, NEW MEXICO

INKBOTTLE

Application filed April 6, 1929. Serial No. 353,069.

This invention appertains to ink bottles and more particularly to ink bottles of the type employed in offices and the like for replenishing ink wells.

One of the primary objects of my invention is to provide an ink bottle of the above character having novel means incorporated therein to permit the convenient use of all of the ink in the bottle and to permit the dipping of an ordinary pen into the bottle and to permit the filling of fountain pens therefrom.

Another important object of my invention is the provision of an ink bottle of the type employed for replenishing ink wells having an ink catching tray therein adjacent to the upper end thereof, said tray being in the nature of a funnel for leading the ink caught to a well, the well being disposed directly below the outlet neck of the bottle whereby a fountain pen can be readily filled from said well by inserting the same through the outlet neck.

A further object of my invention is the provision of an ink bottle used for replenishing ink wells including a body portion and a screw threaded cap for the upper open end thereof, the cap carrying an outlet pouring neck with novel means supported by the cap for catching ink and leading the ink to a well disposed directly below said pouring neck.

A still further object of my invention is to provide an ink well of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a longitudinal section through my improved ink bottle;

Figure 2 is a horizontal section through the same taken on the line 2—2 of Figure 1 looking in the direction of the arrows illustrating the novel ink catching balcony or funnel and the well for receiving the ink from said balcony or funnel;

Figure 3 is a detail vertical section taken at right angles to Figure 1 on the line 3—3 of Figure 2 looking in the direction of the arrows;

Figure 4 is a detail perspective view of the novel ink catching balcony or funnel, showing parts thereof broken away and in section;

Figure 5 is a detail perspective view of my novel well for receiving the ink from the balcony or funnel, and Figure 6 is a bottom plan view of my novel ink catching balcony or funnel.

Referring to the drawings in detail, wherein similar reference characters designate corresponding parts throughout the several views, the letter A generally indicates my improved ink bottle which comprises a body portion 10 including the cylindrical side wall 11 and the bottom wall 12. The upper end of the side wall 11 is provided with external screw threads 13 for the reception of the threaded flange 14 of the closing cap 15. This closing cap 15 can be formed of sheet metal and if desired a suitable gasket or the like can be interposed between the cap and the upper edge of the body. If desired, this cap can be permanently secured to the body in any desired way. Formed on the upper wall of the cap 15 is the outlet pouring neck 16 which is preferably disposed eccentrically on the cap so as to facilitate the pouring of ink from the bottle into an ink well. This pouring neck can be provided with any desired type of removable cap or closure plug 17.

As stated, one of the primary objects of my invention is to provide novel means for permitting the filling of fountain pens and the like from the bottle and permit the use of an ordinary pen with the bottle, it being understood that the bottle is of a relatively large size for office use, such as of a capacity for holding a quart or a pint of ink. In order to carry out the above object, I provide a novel sheet metal tray, funnel or balcony 20 which includes a lower inclined wall 21 which wall has formed on its side edges upstanding side walls 22. The bottom wall 21 is of substantially a triangular configuration and the side walls 22 gradually converge toward their forward ends but are sufficiently spaced to provide an outlet 23. The bottom wall 21 is not only pitched toward the outlet 23, but also has its sides preferably pitched toward the center of the tray or funnel so as to facilitate the leading of the ink toward the outlet 23. The side walls 22 can be secured to the inner face of the top wall of the cap in any preferred way and the rear edge of the bottom wall is cut away as at 24 so as to space the same from the side wall 11 of the ink bottle to facilitate the collecting of ink into the tray or balcony when the bottle is tipped to one side.

Directly below the outlet 23 of the balcony or funnel 20 I provide a novel ink collecting well 25 which can also be formed of sheet metal if desired. This well 25 is arranged directly below the outlet neck 16 and in relatively close proximity thereto and has formed thereon at its upper edge an attaching lip 26 which can be riveted or otherwise secured to the lower wall 21 of the funnel 20 directly below the outlet 23 thereof. The bottom of the well 25 is preferably depressed as at 27 to provide for the collection of ink in the well when the supply therein is greatly diminished.

The bottle is used in the ordinary way for filling ink wells and when the ink falls below the collecting well 25, the bottle is tipped to one side, namely the side adjacent to the cut out portion 24 of the funnel so that the ink will flow over and into the funnel after which the bottle is again placed in upright position and the ink collected by said funnel will flow into the well 25. It is obvious that an ordinary pen can be inserted in the well 25 through the neck 16 when it is desired to obtain ink in this manner. It is also obvious that a fountain pen can be readily inserted into the well and thus filled from the bottle.

Further, in bottles of this type it has been found practically impossible to pour all of the ink therefrom due to the ordinary position of the outlet fount or neck and this leaves a small quantity of ink in the bottle to be wasted.

With my device, this small quantity of ink can be readily collected into the tray or funnel 21 by inverting the bottle and holding the same at an angle toward the tray, and when the bottle is again placed in upright position, the ink will be collected in the well 25 where the same can be used for the purpose of filling fountain pens or the like.

Changes in details may be made without departing from the spirit or the scope of this invention. But what I claim as new is:

As a new article of manufacture, a sealing cap for ink bottles comprising a top wall, an eccentrically disposed pouring neck on said top wall, a depending ink collecting tray including a bottom wall pitched downwardly toward the central portion of the cap of substantially triangular configuration, side walls formed on the side edges of the bottom wall secured at their upper edges to the cap, the side walls converging toward one another and being spaced to form an outlet, the rear edge of the bottom wall being cut away, an ink collecting well disposed directly below the pouring neck, an attaching lip formed on the upper edge of the well, and means securing the attaching lip to the bottom wall directly below the outlet.

In testimony whereof I affix my signature.

CARL D. COMSTOCK.